United States Patent [19]

Maucher et al.

[11] 4,122,929

[45] Oct. 31, 1978

[54] FRICTION CLUTCH, ESPECIALLY FOR MOTOR VEHICLES

[75] Inventors: Paul Maucher, Sasbach; Edmund Maucher, Bühl, Baden, both of Germany

[73] Assignee: LuK Lamellen und Kupplungsbau GmbH, Bühl, Baden, Germany

[21] Appl. No.: 772,593

[22] Filed: Feb. 28, 1977

[30] Foreign Application Priority Data

Feb. 27, 1976 [DE] Fed. Rep. of Germany ....... 2607939

[51] Int. Cl.² .............................................. F16D 13/18
[52] U.S. Cl. .................................. 192/70.18; 192/89 B
[58] Field of Search ............................ 192/70.18, 89 B

[56] References Cited

U.S. PATENT DOCUMENTS

| 2,253,344 | 8/1941 | Nutt et al. ........................... 192/70.18 |
| 3,167,163 | 1/1965 | Smirl et al. .......................... 192/70.18 |
| 3,489,256 | 1/1970 | Binder et al. ................. 192/70.18 X |

FOREIGN PATENT DOCUMENTS

| 2,222,570 | 10/1974 | France .................................. 192/89 B |
| 1,393,968 | 5/1975 | United Kingdom .................... 192/89 B |

*Primary Examiner*—Howard N. Goldberg
*Attorney, Agent, or Firm*—Herbert L. Lerner

[57] ABSTRACT

Friction clutch wherein a cup spring, on the one side thereof, is braced against one of the clutch components other than the pressure plate thereof and, on the other side thereof, loads a pressure plate, torque transmission between the pressure plate and the one of the clutch components other than the pressure plate and lifting of the pressure plate being effected by a plurality of leaf springs which ensure relative movement between the pressure plate and the other of the clutch components at least over the operating travel range of the clutch amounting to the engagement and disengagement travel and the wear travel of the clutch disk, includes top means projecting into the travel path of the leaf springs and being engageable thereby for stopping travel thereof at least when the pressure plate has reached substantially the position thereof corresponding to the maximum wear travel thereof.

10 Claims, 3 Drawing Figures

FRICTION CLUTCH, ESPECIALLY FOR MOTOR VEHICLES

The invention relates to a friction clutch, especially for motor vehicles, and, more particularly, to such a friction clutch wherein a cup or plate spring is braced on the one side thereof against one of the components of the clutch, such, as the cover, and, on the other side thereof, loads a pressure plate, torque transmission between the pressure plate and one of the clutch components other than the pressure plate, such as the cover, and lifting of the pressure plate being effected by a plurality of leaf-spring-like elements which ensure relative movement between the pressure plate and the one of the clutch components other than the pressure plate, such as the cover, at least over the operating travel range of the clutch amounting to the engagement and disengagement travel and the wear travel of the clutch disk.

Such clutches have become known, for example, from U.S. Pat. No. 3,213,991 wherein, leaf spring elements are disposed at least approximately in tangential arrangement extending from the cover to the pressure plate and transmit the torque. The leaf spring elements furthermore take over the lifting of the pressure plate, when the clutch is released or disengaged, by using a spring material for this purpose, and by pre-bending the leaf springs in such a manner that they exert a force in disengagement direction i.e. in the force direction opposed to the direction of force application by the cup springs. Further known heretofore are constructions wherein leaf springs are assembled in an at least substantially flat condition but, however, as viewed in axial direction, with the mounting ends thereof offset relative to one another at the pressure plate and the cover, and the lifting force is thereby generated, also opposed to the direction of force application of the cup spring of the clutch. From German Pat. DBP 1,233,670, a friction clutch has, furthermore, become known, wherein a series of leaf springs is provided for a positive rotary connection between the cover and the pressure plate, and a further series of leaf springs for lifting the pressure plate, for which purpose the last-mentioned leaf springs rest, on the one side thereof, against the cover, and on the other side thereof, are braced resiliently against cam members which extend radially beyond the friction surface of the pressure plate.

These leaf springs are extremely problematical parts, inasmuch as they must be fabricated on a basis of optimal compromise with respect to the materials used and the dimensioning thereof, since many, often contradictory requirements must be met. Thus, leaf springs, such as are shown in U.S. Pat. No. 3,213,991, must, for example, ensure a sufficient number of load alternations over the entire operating travel range of the clutch and, must, furthermore ensure, a sufficient lifting spring force over this operating travel distance which should, however, not be too great, since the lifting force counteracts the contact pressure of the cup spring. Due to spatial conditions, however, these leaf spring elements are extremely prone to deformation, and are deformed, for example, by a deflection exceeding the permissible deflection, whereby the lifting force can be reduced to such an extent that the lifting of the pressure plate from the friction disk is no longer assured and the clutch, therefore, fails.

For this reason, it has already become known heretofore from the U.S. Pat. No. 3,489,256 to provide friction clutches with so-called lift limiters, more specifically, rivets or riveted-on brackets are provided at the cover, for which specially formed counterstops, constructed as radial cams, are provided on the pressure plate. This measure requires considerable additional expense, however, and, furthermore, for example, when using cemented-on instead of riveted-on linings in clutch disks, these rivets or riveted brackets are usually not accommodatable any longer from the standpoint of spatial requirements.

For this reason, instead of rivets or riveted brackets, so-called assembly brackets are often used. They are operatively inserted, during the assembly of the clutch, between the pressure plate and the cover in such a manner that the axial displacement of the pressure plate relative to the cover is permitted thereby only to a given extent. In many cases, the assembly brackets are disposed and/or constructed so that, when the clutch is installed or assembled on the flywheel of an internal-combustion engine or the like, the assembly brackets drop off by themselves or must be removed.

This heretofore known construction or disposition has a disadvantage, however, in that when the clutch is disassembled, for example, for the purpose of replacing the clutch disk, the leaf springs are excessively stressed, i.e. bent too far, and the clutch thereby becomes unusable.

It is accordingly an object of the invention of the instant application to provide a friction clutch, especially for motor vehicles, which avoids the foregoing disadvantages of the heretofore known constructions of this general type and to provide a friction clutch, wherein, with minimum expense, axial travel of the pressure plate relative to the cover beyond a given distance and deformation of the leaf springs associated therewith are avoided, and wherein damage, such as excessively bent leaf springs, cannot occur even if the friction clutch is improperly handled during the course of manufacturing, assembly or installation, or during transportation thereof, for example, due to shocks.

With the foregoing and other objects in view, there is provided, in accordance with the invention, a friction clutch wherein a cup spring on the one side thereof, is braced against one of the clutch components other than the pressure plate thereof and, on the other side thereof, loads a pressure plate, torque transmission between the pressure plate and the one of the clutch components other than the pressure plate and lifting of the pressure plate being effected by a plurality of leaf springs which ensure relative movement between the pressure plate and the other one of the clutch components at least over the operating travel range of the clutch amounting to the engagement and disengagement travel and the wear travel of the clutch disk, comprising stop means projecting into the travel path of the leaf springs and being engageable thereby for stopping travel thereof at least when the pressure plate has reached substantially the position thereof corresponding to the maximum wear travel thereof. In accordance with another feature of the invention, the stop means are disposed on the one component of the clutch. In accordance with a further feature of the invention, the one component of the clutch is the cover thereof, and the stop means are formed on the cover. It may be of particular advantage in this regard, if a cup spring is employed that has a biasing force that has previously been considerably reduced when the cup spring is in the position thereof which corresponds to this axial position of the pressure plate which it has reached after maximum wear travel thereof. Furthermore, by forming the stop means on the clutch cover, the desired effect of the invention is assured in an especially simplified manner and with minimal expense.

The stops for the leaf springs are advantageously provided directly adjacent the point of attachment of the leaf springs to the pressure plate so as to markedly preclude thereby any danger of deformation of the leaf spring.

It is an added object of the invention, to provide a friction clutch wherein the leaf springs have a location at one side thereof at which they are fastened to one of the clutch components and have a location at the other side thereof at which they are fastened to the pressure plate, the leaf springs being formed with a projecting region extending beyond the location at which the leaf springs are attached to the pressure plate at the other side of the leaf springs and extending in a direction away from the one side thereof at which the leaf springs are fastened to the one clutch component, the stop means being disposed on the one clutch component, and the projecting region being located opposite the stop means. It is an additional object of the invention to provide such a projecting region as an elongation of the leaf springs. In this case, the leaf springs i.e. the extension or elongation thereof, comes into contact with regions at the stop means of the clutch cover, which are outside or beyond the resilient region of the leaf springs that is sensitive and essential for the lifting of the pressure plate.

In accordance with yet another feature of the invention wherein the leaf springs have a location at one side thereof at which they are fastened to cam members projecting from the pressure plate at a location thereof beyond the friction diameter thereof and have another location at the other side thereof at which they are fastened to the cover of the clutch, the leaf springs are formed with an elongation extending beyond the location at which they are fastened to the cam members and in a direction away from the side at which the leaf springs are fastened to the cover of the clutch, the elongation of the leaf springs engaging in respective recesses formed in the cover, the stop means being formed on the cover at the recesses for engagment with the elongation.

In accordance with yet a further feature of the invention, wherein the one clutch component is the cover of the clutch and is formed with marginal regions extending parallel to the rotary axis of the clutch for fastening the clutch to a rotating part of a machine, the marginal regions are formed with respective breaks therein serving as the stop means for the projecting region of the leaf springs extending beyond the location at which the leaf springs are attached to the pressure plate, the respective breaks in the marginal regions being located opposite and at a spacing from the projecting region of the leaf springs that correspond substantially to the axial position of the pressure plate assumed by the pressure plate after attaining maximal wear travel and that corresponds to a position of the pressure plate wherein the latter exerts diminished force.

In accordance with another feature of the invention, in addition to engagement of the stop means by the leaf springs in the position thereof corresponding substantially to the maximum wear travel thereof, the cup spring is in stopping engagement with one of the clutch components. In accordance with an additional feature of the invention, the last-mentioned one of the clutch components is the cover of the clutch. In accordance with a concomitant feature of the invention, with respect to the axial travel path of the pressure plate, the cup spring is engageable with the one of the clutch components so as to be stopped thereby while the leaf springs are yet slightly spaced from the stop means. Assurance is thereby provided that the force of the cup spring cannot, therefore, act upon the leaf springs, which additionally preserve them, and thus provide optimum protection, with minimal construction costs, against excess travel of the pressure plate.

Other features which are considered as characteristic for the invention are set forth in the appended claims.

Although the invention is illustrated and described herein as embodied in a friction clutch, especially for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
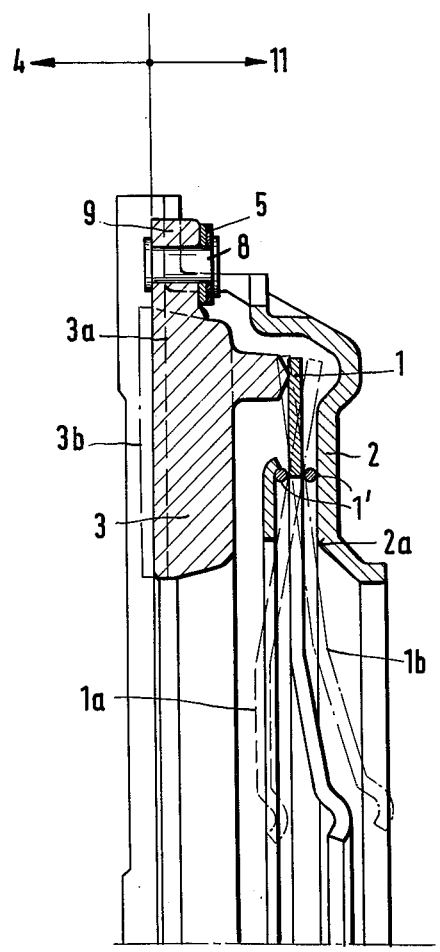
FIG. 2 is a cross-sectional view of FIG. 1 taken along the line II—II in the direction of the arrows.

Referring now to the figures of the drawing, there is shown a cup or plate spring 1 which is fastened and supported by means of abutments 1', tiltably to a cover 2 and loads or biases a pressure plate 3 in direction of an arrow 4, and, in fact, in direction toward a nonillustrated clutch disk. The cover 2 and the pressure plate 3 are connected to each other through leaf spring elements 5, the leading end (as seen in the normal rotary direction in accordance with the arrow 6) being fastened through rivets 7 to the cover 2, and the trailing end through rivets 8 to a cam member 9 which protrudes radially beyond the friction surface. It may be assumed that the indicated position of the cup spring 1 shown in FIG. 2 corresponds to that position which it occupies if the clutch is mounted by means of a mounting rim 10 to a non-illustrated flywheel of an internal-combustion engine and, in fact, when the friction linings of the clutch disk are new. For disengaging the clutch, the cup spring 1 must be swung into the position 1a thereof, shown in broken lines, whereby the pressure plate 3, is lifted into the position 3a thereof shown in broken lines, through the corresponding path of travel of the cup spring 1 by the force of the leaf springs 5, that is directed opposite to the compressive force of the cup spring 1 in the direction of the arrow 11.

It may be assumed that, for the clutch, a wear travel of the pressure plate 3 to the position 3b thereof, shown in phantom, is available at the clutch, which corresponds to the position 1b of the cup spring 1, shown in phantom. In the position 1b shown in phantom, the extreme value or limit of the operating range of the clutch is reached.

Figure 1:
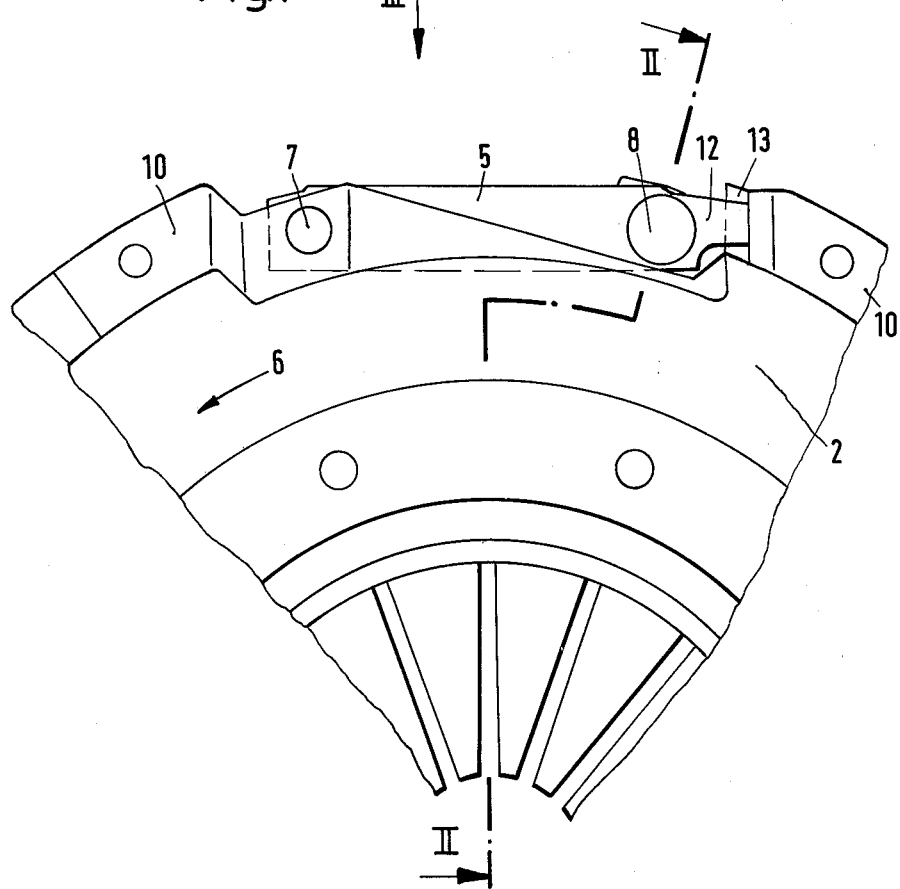
FIG. 1 is a fragmentary elevational view of a friction clutch constructed in accordance with the invention.
Figure 3:
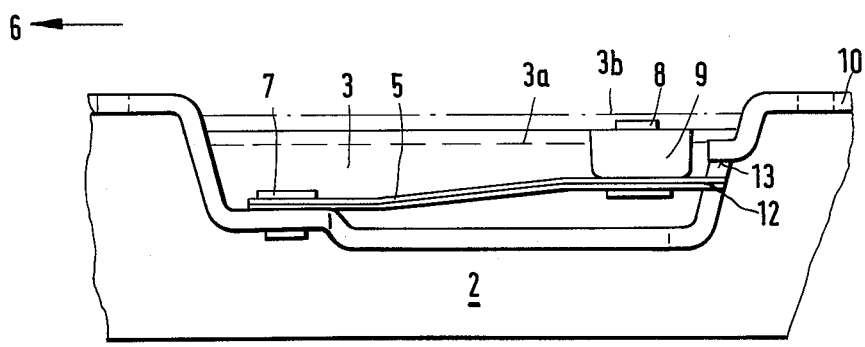
FIG. 3 is an edge view of the clutch as seen in the direction of the arrow III in FIG. 1.

The leaf springs 5 are disposed in tangential relationship to the pressure plate 3 and have an attachment end that is associated with the cam member 9 and constitutes the trailing, fastening end of the leaf springs 5 with respect to the normal rotary direction of the clutch as represented by the arrow 6 (note FIG. 3 especially). In order to avoid further travel of the pressure plate 3 beyond the assumed position 3b thereof, and thereby avoid excessive bending of the leaf springs 5, the latter are provided, at the trailing end thereof at the side of the cam member facing away from the leading, fastening end of the leaf springs 5, namely from the rivet 7, with an extension 12 located opposite a stop 13 engageable by the extension 12 when the pressure plate 3 reaches the position 3b thereof shown in phantom. The stop 13, as illustrated, constitutes a formed part or break at the attachment edge 10 of the cover 2.

In order then to prevent axial travel of the pressure plate 3 beyond the indicated position 3b thereof, even in extreme cases, the cup spring 1 is engageable with a stop 2a of the cover 2 so that it comes to rest in the position 1b thereof corresponding to the position 3b of the pressure plate 3. It may, furthermore, be advantageous in some cases, with a construction of this type e.g. for assembly reasons, if with respect to the axial travel of the pressure plate 3, the cup spring 1 has previously come to rest at the stop 2a, while the leaf springs 5 (in this embodiment, with the region 12 thereof) are yet a slight distance away from the stop 13. This is advantageous in view of the inverse ratio, of the distance (x) to which a spring is braced with a force (F) to the force constant (k) of the spring, thus $x = F/k$. Therefore besides the more facilitated assembly, the force of the cup spring 1 is prevented from being previously reduced due to the opposing force of the leaf springs 5, before the maximum axial shift of the pressure plate 3 to the position 3b thereof is reached i.e. before the maximum wear travel is attained, and that the leaf springs 5 cannot be deformed by the force of the cup spring 1.

The invention, as aforementioned, is not limited to the illustrated embodiment. Thus, the stops 2a and 13, for example, can have a construction that is different from those shown herein, or they can become effective at other axial regions than those shown herein. The extended regions 12 of the leaf springs 5 may furthermore be constructed differently than illustrated herein; for example, they may have a hook-like appearance and may engage different regions of the cover 2.

There are claimed:

1. Friction clutch including a pressure plate and other components wherein a cup spring, on the one side thereof, is braced against one of the other components of the clutch and, on the other side thereof, loads the pressure plate, transmission of torque between the pressure plate and the one of the other cluch components and lifting of the pressure plate being effected by a plurality of leaf springs which ensure relative movement between the pressure plate and the one of the other clutch components, the movement being effective at least over the operating travel range of the clutch which amounts to the engagement and disengagement travel and the wear travel of a clutch disk, comprising means projecting into the travel path of the leaf springs for stopping the travel thereof, said stop means being engageable by the leaf springs for stopping travel thereof at least when the pressure plate has reached substantially the position thereof corresponding to the maximum wear travel thereof.

2. Friction clutch according to claim 1 wherein said stop means are disposed on the one of the other clutch components.

3. Friction clutch according to claim 2 wherein the one of the other clutch components is a cover of the clutch, and said stop means are formed on the cover.

4. Friction clutch according to claim 1 wherein the leaf springs have a location at one side thereof at which they are fastened to one of the other clutch components and have a location at the other side thereof at which they are fastened to the pressure plate, the leaf springs being formed with a projecting region extending beyond the location at which the leaf springs are attached to the pressure plate at the other side of the leaf springs and extending in a direction away from the one side thereof at which the leaf springs are fastened to the one of the other clutch components, said stop means being disposed on the one of the other clutch components, and said projecting region being located opposite said stop means.

5. Friction clutch according to claim 4 wherein said projecting region is an elongation of said leaf springs.

6. Friction clutch according to claim 1 having a clutch cover and a defined friction diameter of the pressure plate, wherein the leaf springs have a location at one side thereof at which they are fastened to cam members projecting from the pressure plate at a location thereof beyond the friction diameter thereof and have another location at the other side thereof at which they are fastened to the cover of the clutch, the leaf springs being formed with an elongation extending beyond the location at which they are fastened to said cam members and in a direction away from the side at which the leaf springs are fastened to the cover of the clutch, said elongation of the leaf springs engaging in respective recesses formed in the cover, said stop means being formed on the cover at said recesses for engagement with said elongation.

7. Friction clutch according to claim 4 wherein the one clutch component is a cover of the clutch and is formed with marginal regions extending parallel to the rotary axis of the clutch for fastening the clutch to a rotating part of a machine, said marginal regions being formed with respective breaks therein serving as said stop means for said projecting region of the leaf springs extending beyond the location at which the leaf springs are attached to the pressure plate, the respective breaks in said marginal regions being located opposite and at a spacing from said projecting region of the leaf springs that corresponds substantially to the axial position of the pressure plate assumed by the pressure plate after attaining maximal wear travel and that corresponds to a position of the pressure plate wherein the latter exerts diminished force.

8. Friction clutch according to claim 1 wherein, in addition to engagement of said stop means by said leaf springs in said position thereof corresponding substantially to maximum wear travel thereof, the cup spring is in stopping engagement with one of the other clutch components.

9. Friction clutch according to claim 8 wherein said last-mentioned one of the other clutch components is a cover of the clutch.

10. Friction clutch according to claim 8 wherein, with respect to the axial travel path of the pressure plate, said cup spring is engageable with said one of the other clutch components so as to be stopped thereby while the leaf springs are yet slightly spaced from said stop means.

* * * * *